US006218504B1

(12) United States Patent
Dolle et al.

(10) Patent No.: US 6,218,504 B1
(45) Date of Patent: Apr. 17, 2001

(54) METHOD FOR DEODORIZING POLYOLEFIN GRANULATES

(75) Inventors: Volker Dolle, Bensheim (DE); Eduardo Chicote Carrion, Riudoms Prov. Tarragona (ES); Paul-Richard Schöneborn, Kriftel; Herbert Terwyen, Frankfurt, both of (DE)

(73) Assignee: Targor GmbH, Mainz (DE)

( * ) Notice: Subject to any disclaimer, the term of this patent is extended or adjusted under 35 U.S.C. 154(b) by 0 days.

(21) Appl. No.: 09/380,404

(22) PCT Filed: Feb. 23, 1998

(86) PCT No.: PCT/EP98/01036

§ 371 Date: Sep. 1, 1999

§ 102(e) Date: Sep. 1, 1999

(87) PCT Pub. No.: WO98/40417

PCT Pub. Date: Sep. 17, 1998

(30) Foreign Application Priority Data

Mar. 7, 1997 (DE) ........................................ 197 09 553

(51) Int. Cl.[7] ........................ C08F 6/26; C08J 3/12; C08J 3/28

(52) U.S. Cl. ........................ 528/483; 528/500; 528/503

(58) Field of Search ........................ 528/500, 501, 528/503, 483

(56) References Cited

U.S. PATENT DOCUMENTS

| | | |
|---|---|---|
| 4,332,933 | 6/1982 | Di Drusco et al. . |
| 4,666,994 | 5/1987 | Zboril . |
| 5,191,062 | 3/1993 | Bernier et al. . |

FOREIGN PATENT DOCUMENTS

| | | |
|---|---|---|
| 2175158 | 10/1996 | (CA) . |
| 2198177 | 8/1997 | (CA) . |
| 4 601 | 10/1979 | (EP) . |
| 96/11216 | 4/1996 | (WO) . |

*Primary Examiner*—Duc Truong
(74) *Attorney, Agent, or Firm*—Keil & Weinkauf

(57) ABSTRACT

A gaseous mixture of steam and air, a gaseous mixture of steam and nitrogen, or pure steam are passed around polyolefin granules in a deodorizing apparatus. The result is that the polyolefin granules have markedly improved properties with respect to odor and taste, and these are retained in moldings produced from the granules.

10 Claims, No Drawings

METHOD FOR DEODORIZING POLYOLEFIN GRANULATES

The invention relates to a process to deodorize polyolefins, and also to the use of deodorized polyolefin granules to produce polyolefin-containing plastic moldings with low taste-impairment and odor-impairment.

Plastic moldings produced from polyolefins are of great industrial importance; since polyolefins, as saturated hydrocarbons, are to a large extent chemically inert such moldings have, inter alia, a wide variety of applications in the production of domestic products and domestic electrical devices, as packaging materials, eg. for foods, and also as piping, eg. for cold-water and hot-water supply lines.

In the preparation and processing of raw materials for plastics, on the one hand additives, such as stabilizers, plasticizers, etc. are added to the polyolefins, and on the other hand low concentrations of monomeric building blocks remain behind. Although the raw materials and additives used, and also the concentration of residual chemical building blocks in the plastic moldings produced from these materials, are not hazardous under food legislation and in terms of industrial hygiene, in some applications the odor and taste perceived by the individual are impaired.

For this reason, deodorants, ie. agents to improve odor, which merely conceal the undesirable odor and taste properties, are used to deodorize products from the domestic goods, plastics, coatings and colorants, textile and detergent industries.

There is also a known process for reducing chlorine contents and residual solvent contents during production of polypropylene powders (DE-A-3025051). Granules are produced from powders treated in this way, with addition of stabilizers. Plastic moldings which are produced from this material, however, exhibit noticeable odor-impairment and taste-impairment.

It is an object of the present invention to provide a process which, in a satisfactory manner, can improve the characteristic odor and taste which are typical of polyolefin moldings.

We have found that this object is achieved by means of a process to deodorize polyolefin granules, which comprises passing a gaseous mixture of steam and air, a gaseous mixture of steam and nitrogen ($N_2$), or pure steam, around the polyolefin granules.

Surprisingly, it has been found that polyolefin granules around which a steam/air mixture, a steam/nitrogen mixture, or pure steam, has been passed have markedly improved oder and taste properties, which are reproduced in the plastic moldings produced therefrom, for example by extrusion or injection molding.

The novel process may be operated continuously or discontinuously, at atmospheric pressure, at elevated pressure, advantageously up to 10 bar, or at reduced pressure. The amounts of steam used per unit are from 0.01 to 2 kg of steam per kg of polyolefin granules, advantageously from 0.3 to 2 kg of steam per kg of polyolefin granules. The temperature is generally from 80 to 150° C., preferably from 90 to 130° C. The granules may be introduced into the apparatus in wet or dry, and cold or heated, form. Depending on how the process is executed, the duration of treatment may be a few minutes or several hours. With elevated pressure, a high amount of steam per unit and high temperature, the duration of treatment may, for example, be from only 2 to 30 minutes; with other methods it may be up to 48 hours. A duration of treatment of from 1 to 10 hours is advantageous and of industrial interest.

In addition, the invention provides the use of the polyolefin granules treated by the novel process as a material for coating or producing shaped objects, in particular for application as domestic goods and as piping.

The polyolefin granules used according to the invention include granules which comprise polyolefins of the structure

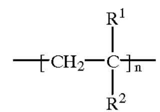

where each of $R^1$ and $R^2$ is hydrogen, a straight-chain or branched saturated aliphatic radical having from 1 to 6 carbon atoms or a cycloaliphatic group. Granules which comprise polyolefin copolymers are also included.

Preferred polyolefins are polyethylenes (PE), polypropylenes (PP), poly-1-butenes (PB), polyisobutenes and poly-4-methyl-1-pentenes, and also copolymers of ethylene and propylene (ie. random copolymers and polyolefin rubbers), terpolymers of ethylene, propylene and hydrocarbons which contain two or more non-conjugated double bonds (ie. polyolefin elastomers) and mixtures of PP, rubber and PE, which are prepared, for example, by coextrusion (extruder blends) or in situ (C2/C3 reactor blends).

The novel process may be used with particular advantage on pipe materials made from polyethylene or polypropylene, in particular on PP materials which have an MFI (230/5) of from 0.4 to 2 dg/min and an ethylene content of from 0.0 to 11% by weight and are in the form of granules. These materials are supplied by various polyolefin producers and may be pigmented or unpigmented.

Depending on the application, the polyolefin granules used according to the invention may also contain additives, for example stabilizers, plasticizers, colorants, agents to protect against the action of light, flame retardants, antioxidants or nucleating agents, and/or fillers, for example chalk, talc, mica, glass fiber or glass beads.

Possible apparatus for carrying out the deodorization of the polyolefin granules are extraction columns, flow tubes, filter screens, mixing vessels, pressure vessels, silos and fluidized-bed reactors, but preferably mixing vessels, pressure vessels or silos. All of the apparatus which can be used according to the invention share the feature that the polyolefin granules are subjected to a steam treatment, in particular to a steam distillation or steam extraction in the apparatus. Air or nitrogen may be added to the steam here. Possible versions of the novel process are described in the examples. A characteristic feature of the deodorization process is the treatment of granules. However, the process can also be used to deodorize plastic moldings.

To judge the odor-impairment or taste-impairment by each type of polyolefin granule, the threshold value for odor or taste (TVOT) is determined in an oder or taste test. The detailed specification is laid out in Example 2.

The deodorized polyolefin granules may be used to produce hollow bodies, piping, packaging materials, packaging films, filters, hygiene fabrics, casings for white goods (e.g. coffee machines) and polyolefin sheets for the construction of equipment. The deodorized polyolefin granules are particularly suitable for producing supply lines for cold and hot water for drinking, water tanks, drinking cups and food packaging.

The polyolefin molding compositions may be brought into their desired final form by usual processes, such as compression molding, casting, calendering, extruding, blow molding, injection molding, etc.

EXAMPLES

1. Production of Polypropylene (PP) Granules

The following examples of the process were carried out with PP granules commonly used to produce PP pipes and produced according to Examples 1 and 2 of the German Patent Application 19606510.0 (1996). These granules were regranulated in air in a twin-screw extruder at 300° C., then dried at 100° C. in a stream of nitrogen and then regranulated two further times.

2. Determination of the Threshold Value for Odor or Taste

The granules are firstly rinsed for 30 minutes with mains water. 8.5 g of wet granules are weighed out into a 250 ml Erlenmeyer flask. The flask is filled with test water (=mains water) to a volume of 250 ml and heated to 70° C. in a water bath. A sample of the mains water is put aside as zero sample. The granules are stirred in the Erlenmeyer flask with a magnetic stirring bar for 4 h at 70° C. Test water and granules are separated by filtering, and the test water is brought to 25° C.

The following dilutions were prepared:

Dilution 1: 100% test water

Dilution 2: 50% test water/50% zero sample

Dilution 3: 25% test water/75% zero sample

Dilution 4: 12.5% test water/87.5% zero sample

Odor test: The odor of each dilution is sampled by at least three people and their subjective perception is noted in each case. The TVOT is determined using Table 1 below. For example, the result is TVOT1 if at dilution 1 there is slight impairment by odor and dilutions 2 to 4 have no odor. The result is TVOT2–4 if at dilutions 1 and 2 there is severe impairment by odor and dilutions 3 and 4 have no detectable odor.

Taste test: Instead of an odor test, a taste test is undertaken on the test water and the perception noted in each case. The assessment with the grades TVOT0 to TVOT16 is likewise made according to Table 1.

TABLE 1

Determination of the TVOT

| TVOT | Dilution 1 | Dilution 2 | Dilution 3 | Dilution 4 |
|---|---|---|---|---|
| 0* | none | | | |
| 1* | slight | none | | |
| 1–2 | severe | none | | |
| 2 | severe | slight | none | |
| 2–4 | | severe | none | |
| 4 | | | slight | none |
| 4–8 | | | severe | none |
| 8 | | | | slight |
| 8–16 | | | | severe |

*Samples assessed TVOT0 or TVOT1 are counted as not having a significant taint and are designated "nst". Granules thus designated are particularly suitable for producing supply lines for drinking water.

3. Gray PP granules produced according to Example 1 were placed in an apparatus which consists of a vertical cylindrically shaped stainless steel tube, with a diameter of 11.9 cm and a height of 103 cm. The apparatus is provided with a steam supply, an opening for nitrogen and a condenser, and with equipment for measuring temperature, pressure and amounts of nitrogen and steam. The stainless steel tube can be heated electrically from the outside. Granules are placed in the apparatus and it is then flushed with nitrogen and heated to 100° C. Nitrogen and steam are then introduced from below, the nitrogen being preheated to about 90° C. The gaseous mixture (steam and nitrogen) passed out of the apparatus overhead, and was discarded. After a specified time, the pressure in the apparatus was released; cold nitrogen (23° C.) was passed through the apparatus, and it was cooled. The apparatus was then opened, and the PP granules were removed.

Execution examples:

Experiments 3(a)–(e): variation of the amount of nitrogen

Experiments 3(f)–(g): variation of the duration of treatment

Experiments 3(h)–(i): variation of the temperature and steam pressure

Experiments 3(j)–(k): variation of the amount of steam and the duration of treatment Experiment 3(l): replacement of the nitrogen by air The precise experimental data are given in Table 2.

The individual samples of PP granules from Example 3, and also untreated PP granules as a reference sample, were dried in a stream of nitrogen at 120° C. in a drying cabinet. An odor test was then carried out. The TVOT determined are given in the last column of Table 2.

5. The procedure of Example 3 was followed, but instead of the gray PP granules, unpigmented PP granules were used. The experimental data are given in Table 3.

6. The individual samples of PP granules from Example 5, and also untreated PP granules as a reference sample, were dried in a manner similar to that of Example 4 and subjected to an odor test. The TVOT determined are given in the last column of Table 3.

7. The procedure of Example 3(e) was followed, but 60% of the steam/nitrogen mixture, after it had passed through the apparatus, was reintroduced into the apparatus from below. The remaining 40% was discarded as exhaust gas. The PP granules were assessed in a manner similar to that of Example 4; the test result was TVOT0 (nst).

8. The granules from Example 1 were placed in a deodorizing apparatus which consists of a vertical cylindrically shaped container, with a diameter of 2 m, a height of 6 m and a volume of 38 $m^3$, with a steam supply, an opening for hot air, a condenser, temperature measurement, pressure measurement and measurement of the amounts of hot air and steam. The container can be heated electrically from the outside. After the granules had been placed in the apparatus, it was heated to 100° C. with hot air and by introducing low-pressure steam. A pressure of 180 mbar became established. Hot air and low-pressure steam were introduced from below. The air was preheated to about 90° C. After a specified time, the pressure in the apparatus was released; nitrogen was passed through the apparatus, and it was cooled. The PP granules were discharged downward from the apparatus into a Gala dryer and from there into a vibrating screen dryer. The precise experimental data are as follows:

| Deodorization apparatus: | |
|---|---|
| Fresh steam: | 2500 kg/h |
| Hot air: | 700 kg/h |
| Water: | 100 kg/h |
| Temperature (steam): | 125° C. |
| Temperature PP granules bed: | 100° C. |
| Gauge pressure | 180 mbar |
| Time: | 12 h |
| Steam usage: | 0.5 kg of steam/kg of PP |
| Dryer: | |
| Throughput: | 6000 kg/h |
| Moisture before Gala dryer: | 3–4% water |
| Moisture after Gala dryer: | 1000 ppm water |

The TVOT of the granules was determined according to Example 2. The test result was TVOT0 (nst).

9. The experiment of Example 8 was repeated in the same apparatus. The apparatus was operated continuously. The residence time was adjusted to 12 h. Further experimental data are as follows:

| Deodorization apparatus: | |
|---|---|
| Fresh steam: | 2500 kg/h |
| Hot air: | 700 kg/h |
| Temperature (steam): | 125° C. |
| Temperature PP granules bed: | 100° C. |
| Gauge pressure | 180 mbar |
| Time: | 12 h |
| Steam usage: | 0.5 kg of steam/kg of PP |
| Dryer: | |
| Throughput: | 6000 kg/h |
| Moisture before Gala dryer: | about 0.7% water |
| Moisture after Gala dryer: | 1000 ppm water |

| The TVOT of the granules was determined according to Example 2 | |
|---|---|
| Result of the odor test: | TVOT0 (nst) |
| Result of the taste test: | TVOT0 (nst) |

TABLE 2

Overview of experiments in Examples 3 and 4

| Experiment | Amount [kg] | Time [h] | Amount of nitrogen [1 at S.T.P/h] | Amount of steam [1/h] | Temperature [° C.] | Pressure [bar] | TVOT |
|---|---|---|---|---|---|---|---|
| Reference | — | — | — | — | — | — | 8–16 |
| a | 2 | 4 | 0 | 1.6 | 105 | 1 | 2 |
| b | 2 | 4 | 500 | 1.6 | 105 | 1 | 0 |
| c | 2 | 4 | 750 | 1.6 | 105 | 1 | 0 |
| d | 2 | 4 | 1000 | 1.6 | 105 | 1 | 0 |
| e | 2 | 4 | 1500 | 1.6 | 105 | 1 | 0 |
| f | 4 | 2 | 300 | 1.4 | 105 | 1 | 1–2 |
| g | 4 | 2 | 500 | 1.4 | 105 | 1 | 1–2 |
| h | 4 | 2 | 100 | 1.6 | 120 | 2 | 0 |
| i | 4 | 2 | 300 | 1.6 | 120 | 2 | 0 |
| j | 4 | 2 | 1500 | 2.4 | 120 | 2 | 0 |
| k | 4 | 5 | 200 | 0.4 | 120 | 2 | 0 |
| l | 2 | 4 | Air: 1500 | 1.6 | 105 | 1 | 0 |

Overview of experiments in Examples 5 and 6

| Experiment | Amount [kg] | Time [h] | Amount of nitrogen [NI/h] | Amount of steam [1/h] | Temperature [° C.] | Pressure [bar] | TVOT |
|---|---|---|---|---|---|---|---|
| Reference | — | — | — | — | — | — | 8–16 |
| a | 2 | 4 | 0 | 1.6 | 105 | 1 | 2 |
| b | 2 | 4 | 500 | 1.6 | 105 | 1 | 0 |
| c | 2 | 4 | 750 | 1.6 | 105 | 1 | 0 |
| d | 2 | 4 | 1000 | 1.6 | 105 | 1 | 0 |
| e | 2 | 4 | 1500 | 1.6 | 105 | 1 | 0 |
| f | 4 | 2 | 300 | 1.4 | 105 | 1 | 1–2 |
| g | 4 | 2 | 500 | 1.4 | 105 | 1 | 1–2 |
| h | 4 | 2 | 100 | 1.6 | 120 | 2 | 0 |
| i | 4 | 2 | 300 | 1.6 | 120 | 2 | 0 |
| j | 4 | 2 | 1500 | 2.4 | 120 | 2 | 0 |
| k | 4 | 5 | 200 | 0.4 | 120 | 2 | 0 |
| l | 2 | 4 | Air: 1500 | 1.6 | 105 | 1 | 0 |

TVOT0 = "nst".

We claim:

1. A process to deodorize polyolefin granules,which contain no units derived from dienes, in an apparatus, which comprises firstly passing a gaseous mixture of steam and air, a gaseous mixture of steam and nitrogen, or pure steam around the polyolefin granules at from 80 to 150° C., where the amount of steam used is from 0.3 to 2 kg of steam per kg of polyolefin granules, and then returning some or all of the steam, the steam/air mixture or the steam/nitrogen mixture to the apparatus after it has passed through the apparatus.

2. The process of claim 1, wherein the duration of treatment is from 2 minutes to 48 hours.

3. The process of claim 1, wherein the temperature is from 90 to 130° C.

4. The process of claim 1, wherein the polyolefin granulates comprises polyolefin which is selected from the class encompassing polyethylene, polypropylene, poly-1-butene, polyisobutene, poly-4-methyl-1-pentene, copolymers of ethylene and propylene, terpolymers of ethylene, propylene and other hydrocarbons, mixtures of polypropylene, rubber and polyethylene and mixtures of the constituents mentioned above.

5. The process of claim 1, wherein the polyolefin granulates comprise polypropylene having an MFI (230/5) of from 0.4 dg/min to 2 dg/min and from 0 to 11% by weight of polyethylene.

6. A process to coat or to produce shaped objects, wherein the material used is polyolefin granulates treated according to the process of claim 1.

7. A process to coat or to produce shaped objects for the domestic goods sector and for the construction of equipment, wherein the material used is polyolefin granulates treated according to the process of claim 1.

8. A process to coat or to produce containers or piping, wherein the material used is polyolefin granules treated according to the process of claim 1.

9. The process of claim 2, wherein the duration of treatment is from 1 to 10 hours.

10. The process of claim 1, wherein the polyolefin granules are polyethylene or polypropylene.

* * * * *